March 17, 1964  R. F. BENTLEY ETAL  3,125,700
AUTOMATIC ELECTRODE WEAR COMPENSATOR
Filed Aug. 10, 1960  2 Sheets-Sheet 1

INVENTORS
Robert F. Bentley,
Roger A. Hack &
Thomas T. Stapleton
BY
Paul J. Ethington
ATTORNEY United States Patent Office 3,125,700
Patented Mar. 17, 1964

3,125,700
AUTOMATIC ELECTRODE WEAR COMPENSATOR
Robert F. Bentley, Pontiac, Roger A. Hack, Birmingham, and Thomas T. Stapleton, Clawson, Mich., assignors to General Motors Corporation, Detroit, Mich., a corporation of Delaware
Filed Aug. 10, 1960, Ser. No. 48,766
7 Claims. (Cl. 314—69)

This invention relates to an electrode advancing mechanism and more particularly to an electrode wear compensating device for an electric discharge machining tool.

In electrical discharge machining, hereinafter referred to as EDM, as well as in other processes, an electrode is used which is slowly eroded so that it is necessary to periodically advance it to keep it in proper relationship with the head of the machine. An EDM apparatus is described in the copending application, Colten et al., Serial No. 832,345, filed August 7, 1959, now Patent No. 3,059,150, and assigned to the same assignee as this application, wherein an electric power supply provides current pulses to an electrode for machining a workpiece. The electrode voltage is a function of the gap distance between the electrode and the workpiece and this voltage is compared to a reference voltage. The voltage differential is used to control a servo mechanism which, in turn, moves the electrode to maintain a constant gap as the cut progresses through the workpiece. After several cuts the electrode will wear by an amount which exceeds the optimum range of travel of the servo mechanism.

Manually operated means have been proposed to adjust the electrode to compensate for wear. However, this necessitates an undesirable "down time" for the machine and, in addition, requires the constant attention of a skilled operator.

Automatic electrode wear compensators have been designed which require an elaborate and extremely sensitive electronic circuit for maintaining the electrode in a desired position.

An object of this invention is to provide a relatively simple automatic electrode wear compensator which will advance the electrode in increments to enable the servo mechanism to operate within its optimum range. This is accomplished by affording a signal means for indicating when an electrode adjustment is necessary for advancing the electrode and a linear actuator for moving the electrode holder to a new position in response to the signal means.

The above and other advantages of this invention will be made more apparent from the following specification taken in conjunction with the accompanying drawings wherein like numerals refer to like parts and in which:

FIGURE 1 is a schematic, elevational view of an electrode control apparatus according to the present invention;

FIGURE 2 is a detailed elevational view of the electrode holder of FIGURE 1;

FIGURE 3 is a plan view of the electrode holder with the drive nut in driving position;

FIGURE 4 is a plan view of the electrode holder with the drive nut in released position;

FIGURE 5 is a cross-sectional view of the electrode gripping jaws taken along line 5—5 of FIGURE 2.

Figure 6:
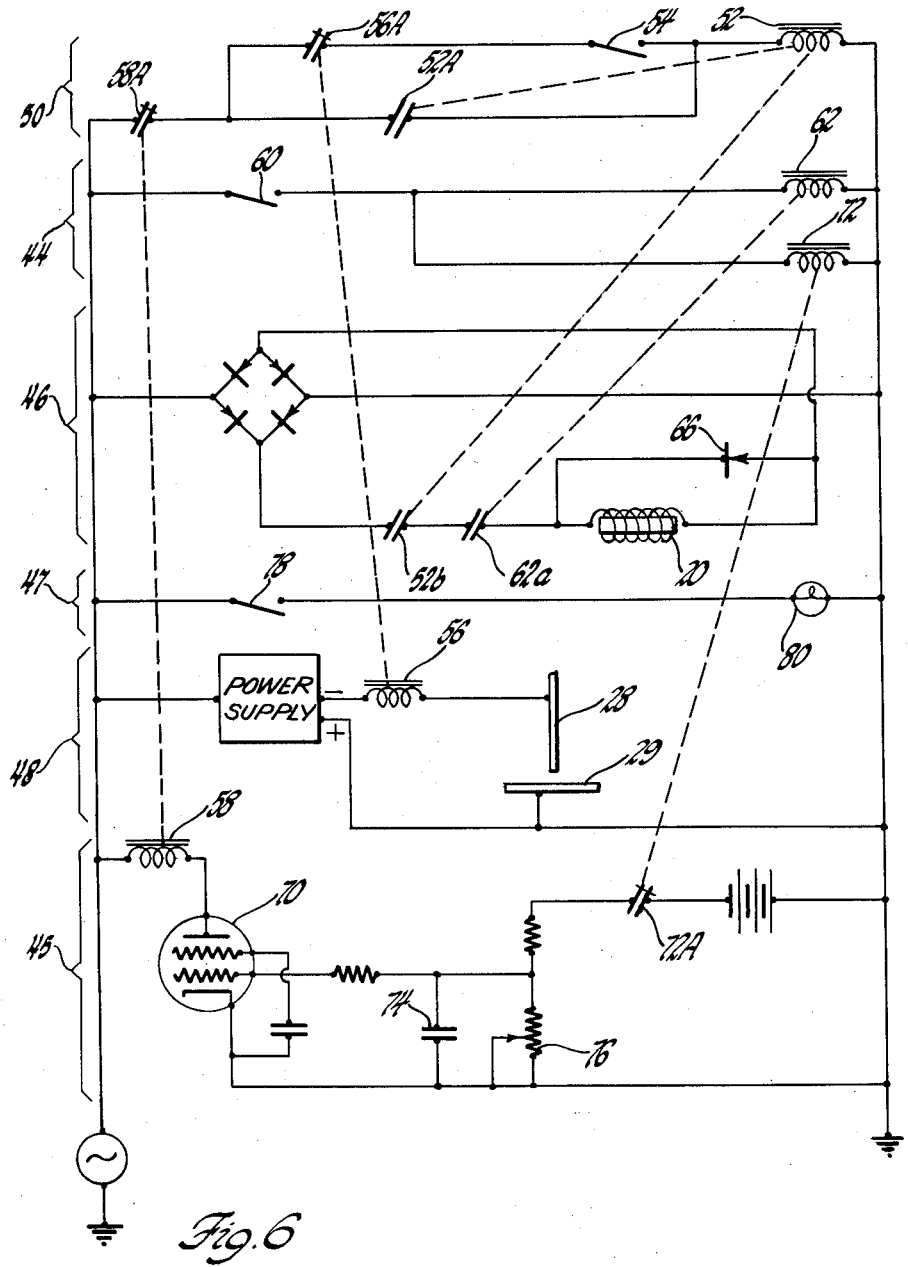
FIGURE 6 is a schematic diagram of the control circuit for the electrode wear compensator according to the present invention.

Referring to FIGURE 1, an electrode wear compensator denoted generally by the numeral 10 is shown installed on an electric discharge machine of the type described in the above-identified Colten et al. application. A servo motor 16 movably carries an electrode carrier assembly 15 for linear movement in the direction of the axis of the electrode 28. The wear compensator 10 includes a lead screw 14 rotatably mounted on the carrier 15 by top and bottom supports 17 and 18 which supports extend laterally from the carrier 15. A rotary solenoid 20 mounted above the bracket 17 is drivably connected to the lead screw 14 through a one-way clutch 22. An electrode holder 24 is slidably mounted on a guideway 26 that is secured to the electrode carrier 15. The electrode holder 24 carries an electrode 28 which extends downwardly toward a workpiece 29.

A releasable drive nut 30, illustrated in FIGURES 2, 3 and 4, is carried by the electrode holder 24 and is spring biased into engagement with the lead screw 14 by a compression spring 32. A release lever 35 pivoted on the top of the holder 24 has a slot 34 embracing a pin 37 on the drive nut 30 so that, by swinging the release lever 35, the drive nut will, by the camming action of slot 34 on pin 37, be withdrawn from engagement with the screw 14.

The electrode 28 is clamped into position relative to the electrode holder 24 by a gripping arm 36 pivoted at 38 so that the jaws 40 and 41 on the arm 36 and a holder extension 39, respectively, will engage the electrode 28. The arm 36 is biased into engagement with the electrode by a compression spring 42 which is located above the pivot 38 and acts between the holder 24 and arm 36. The electrode then can be removed for replacement simply by depressing the gripping arm 36 in the vicinity of the spring 42 thereby causing the arm 36 to pivot and release the grip of the jaws 40 and 41.

Switches 54 and 60 mounted on a support which is stationary with respect to the servo motor 16 have arms extending toward the carrier 15 for engagement with cam members 54' and 60' secured to the carrier 15. Upon downward movement of the carrier to make a new cut in the workpiece, electrode current will begin to flow when the electrode is at a predetermined distance from the workpiece. The switch 54 is so arranged that, when the electrode is worn enough to require readjustment, said switch will close just before electrode current starts to flow. The switch 60 will be closed when the carrier has moved far enough to have completed the cut.

Referring to FIGURE 6, the electrical control circuit for the electrode wear compensator includes a power supply circuit 48, an electrode wear circuit 50, an electrode advance circuit 46, a cycle end circuit 44, a time delay circuit 45 and an electrode replace circuit 47. The power supply circuit 48 delivers pulsed current through a current hold-in relay 56 to the electrode 28.

The electrode wear circuit 50 includes normally closed relay contacts 58A and 56A in series with the electrode wear switch 54 and a relay 52. Normally open relay contacts 52A are placed in parallel with the contacts 56A and switch 54 so that, when the relay 52 is energized, the contacts 52A will be closed thereby shunting out the switch 54 and contacts 56A. In this condition the contacts 52A operate as holding contacts for relay 52 rendering switch 54 and contacts 56A ineffective until contacts 58A are opened to break the circuit. On the other hand, if the power supply current flows through the relay 56 prior to the closing of contacts 52A, then contacts 56A will be opened to render switch 54 ineffective and thereby prevent energization of relay 52. The switch 54 is so located relative to the carrier 15 that, during normal operation with a properly adjusted electrode, the switch 54 will not be closed until after the current has started to flow in the electrode circuit 48. As described above, the closing of the switch 54 will then have no effect. However, if the electrode should be so eroded that it needs to be advanced for proper operation, then the downward movement of the carrier will close the switch 54 before the electrode is placed in operating position and current begins to flow. Under these circumstances, relay 52 will be energized and, due to the operation of the holding contacts 52A, will remain energized until opening of contacts 58A.

The cycle end circuit 44 comprises relays 62 and 72 in parallel, both being in series with cycle end switch 60, thus permitting operation of the relays when switch 60 is closed after the cut through the workpiece 29 is completed.

The electrode advance circuit 46 has a full wave rectifier to supply D.C. voltage to the rotary solenoid 20. The solenoid 20 is placed in series with normally open relay contacts 52B and 62A. A diode 66 is connected in parallel with rotary solenoid 20 to suppress arcing across the contacts 52B and 62A. When relay 52 is energized, as described above, contacts 53B will be closed and, when relay 62 is energized, contacts 62A will be closed. In this condition the rotary solenoid 20 will be energized.

In order to prevent rotary solenoid 20 from being deenergized before it has completed a predetermined amount of movement, the time delay circuit 45 is provided. In this circuit is a timing relay 58 in series with a thyratron 70 arranged to have a negative grid bias during the period when the cycle end relay 72 is deenergized and the contacts 72A are closed. A D.C. voltage source acting through the contacts 72A places a negative charge on the capacitor 74 which is connected to the thyratron grid. However, when the cycle end switch 60 is closed, the cycle end relay 72 is energized and the contacts 72A are opened. As a result, the charge on capacitor 74 is permitted to drain off through a potentiometer 76 until a predetermined interval of time has elapsed and the grid bias on the thyratron 70 is at a level such that the thyratron 70 becomes conductive and current is drawn for energizing the timing relay 58. It is readily seen that the potentiometer 76 may be adjusted to vary the discharge time of capacitor 74 thereby providing a means of adjusting the time delay interval to the desired period. Other types of time delay circuits may be used to control the energization of relay 58 and the circuit described herein is merely illustrative of a preferred embodiment.

When the relay 58 is energized, the normally closed contacts 58A in the electrode wear circuit 50 are opened thus causing the electrode wear relay 52 to drop out and, in turn, open contacts 52B in the electrode advance circuit 64. The rotary solenoid 20 will then, due to an internal bias, rotate back to the starting position.

A "replace electrode" switch 78 mounted stationary with respect to servo motor 16 has an arm extending into the path of a cam 78' which is carried by the electrode holder 24. When the electrode has been nearly all consumed and the electrode holder 24 has moved to its lowermost position, the cam 78' will cause switch 78 to close. Referring to the "replace electrode" circuit 47, it will be seen that the closing of switch 78 energizes a pilot light 80. This light serves as a warning to the machine operator that the electrode must be replaced thereby relieving the operator of the necessity of frequently inspecting the electrode itself.

In operation, the servo motor 16 will be actuated by control circuitry, not shown, to lower the carrier 15 and, hence, the electrode 28 toward the workpiece 29 to hold the electrode at a predetermined distance from the workpiece during the cut and to retract the carrier 15 and the electrode 28 from operating position when the cut is completed. During normal operation, as previously described, the electrode current will flow through relay 56 before the electrode wear switch 54 is closed and the electrode wear compensating mechanism will be inactive. However, after several cuts the electrode will gradually become shortened due to erosion thereby causing the carrier 15 to move down further than normal before the electrode current can begin. When this occurs the electrode switch 54 will be closed before the electrode current begins and, as described above, will condition the circuit to energize the rotary solenoid 20 upon completion of the cut as determined by the closing of the cycle end switch 60. When the rotary solenoid is energized, lead screw 14 will be caused to rotate through the same number of degrees as the solenoid 20 thereby moving the electrode holder downwardly a predetermined amount. The amount of downward movement is determined by the pitch of lead screw 14 as well as by the amount of rotation of rotary solenoid 20. When the solenoid 20 is deenergized and returns to its initial position due to its bias, the lead screw 14 will not be affected because of the interruption by the one-way clutch 22. The electrode will then be in position for another series of proper operations until the electrode is again shortened and the compensation mechanism is brought into play again.

When the electrode is to be replaced, the lever 35 on the electrode holder is rotated to withdraw the drive nut from lead screw 14 and the holder is manually raised to a new position—usually the topmost setting—so that a full length of the electrode may be inserted therein. As described above, to replace the electrode 28 it is merely necessary to pivot the gripping arm 36 against the bias of spring 42 to open the jaws 40 and 41.

It is thus seen that this invention provides a simple, automatic mechanism for compensating for the wear of a slowly consumable electrode to position the electrode so that the main servo motor may always be maintained within its optimum operating range. Obviously, the invention may be employed not only with EDM machines, but also with other machines which require a periodic adjustment of electrode position.

While a preferred embodiment of the invention has been disclosed herein, the invention is not to be construed to be limited to the specific structure shown but rather is to be limited only by the following claims.

We claim:

1. An electrode wear compensator comprising means for advancing the electrode including control means for said advancing means comprising an electrode wear circuit for producing a signal when an electrode adjustment is required, an electrode current sensing circuit for preventing the initiation of said signal when said current is flowing, and an electrode advance circuit responsive to the said signal for energizing said advancing means.

2. An electrode wear compensating means comprising an electrode carrier means, an actuator for moving said carrier means, an electrode holder slidably mounted on said carrier means, a second actuator secured to said carrier means, a lead screw rotatably mounted on said carrier means adapted to be rotated by said second actuator, means associated with said electrode holder and engaging said lead screw for effecting rectilinear movement of said holder upon rotation of said screw, control means for said second actuator comprising an electrode wear circuit for producing a signal when an electrode adjustment is required, an electrode current sensing means for preventing the initiation of said signal when said current is flowing, and an electrode advance circuit responsive to the said signal for energizing said second actuator.

3. An electrode wear compensating means, comprising an electrode carrier means, a servo motor for advancing said carrier means, an electrode holder movably mounted on said carrier means, a second servo motor secured to said carrier means, said second servo motor being connected to said electrode holder for advancing said holder upon energization of said second servo motor, control means for said second servo motor comprising an electrode wear circuit for producing a signal when an electrode adjustment is required, an electrode current sensing circuit for preventing the initiation of said signal when said current is flowing, and an electrode advance circuit responsive to the said signal for energizing said second servo motor.

4. An electrode wear compensating means, comprising an electrode carrier means, a servo motor for linearly moving said carrier means to locate said electrode at various desired positions relative to a workpiece, an electrode holder slidably mounted on said carrier means, a rotary solenoid secured to said carrier means, a one-way clutch rotatably driven by said solenoid, a lead screw journaled on said carrier assembly in rotary driving engagement with said clutch, a drive nut on said electrode holder releasably engaging said lead screw for effecting linear movement of said holder upon rotation of said screw, and solenoid control means responsive to electrode wear for automatically energizing said solenoid thereby advancing the said electrode.

5. An electrode wear compensating means, comprising an electrode carrier means, a servo motor for linearly moving said carrier means to locate said electrode at various desired positions relative to a workpiece, an electrode holder slidably mounted on said carrier means, a rotary solenoid secured to said carrier means, a one-way clutch rotatably driven by said solenoid, a lead screw journaled on said carrier assembly in rotary driving engagement with said clutch, a drive nut on said electrode holder releasably engaging said lead screw for effecting linear movement of said holder upon rotation of said screw, control means for said rotary solenoid comprising an electrode wear circuit for producing a signal when an electrode adjustment is required, an electrode current sensing means for preventing the initiation of said signal when said current is flowing, and an electrode advance circuit responsive to the said signal for energizing said rotary solenoid.

6. An electrode wear compensating means for an electrical discharge machining tool, comprising an electrode carrier means, a servo motor for linearly moving said carrier means to locate said electrode at various desired positions relative to a workpiece, an electrode holder slidably mounted on said carrier means, a rotary solenoid secured to said carrier means, a one-way clutch rotatably driven by said solenoid, a lead screw journaled on said carrier means and in rotary driving engagement with said clutch, a drive nut on said electrode holder releasably engaging said lead screw for effecting linear movement of said holder upon rotation of said screw, control means for said rotary solenoid comprising an electrode wear circuit including a switch responsive to carrier displacement for producing a signal when electrode adjustment is required, an electrode current sensing circuit for preventing the initiation of said signal while said current is flowing, a cycle end circuit including a second switch responsive to carrier displacement for producing a second signal when a machining operation has been completed, an electrode advance circuit responsive to the two said signals for energizing said rotary solenoid, and a time delay circuit responsive to said second signal for deenergizing said solenoid after a predetermined amount of rotation has occurred.

7. An electrode wear compensating means comprising an electrode carrier means, an electrode holder movably mounted on said carrier means, first servo means for advancing said carrier means for maintaining a constant electrode gap, and second servo means secured to said carrier means and connected to said electrode holder for advancing said holder when said first servo means advances the carrier means through a predetermined range of travel.

References Cited in the file of this patent

UNITED STATES PATENTS

| | | |
|---|---|---|
| 1,552,060 | Kramer et al. | Sept. 1, 1925 |
| 2,065,735 | Preddey | Dec. 29, 1936 |
| 2,173,446 | Heindhofer | Sept. 19, 1936 |
| 2,622,223 | Buckingham | Dec. 16, 1952 |
| 2,761,050 | Ballbausen | Aug. 28, 1956 |
| 2,818,491 | Matulaitis | Dec. 31, 1957 |
| 3,047,707 | De Bruyn | July 31, 1962 |